United States Patent
Tan et al.

(10) Patent No.: US 8,106,132 B2
(45) Date of Patent: Jan. 31, 2012

(54) POLYESTER RESIN COMPOSITION

(75) Inventors: Junji Tan, Sodegaura (JP); Yasuhiro Mutou, Sodegaura (JP); Seiji Ota, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 666 days.

(21) Appl. No.: 10/538,750

(22) PCT Filed: Jan. 8, 2004

(86) PCT No.: PCT/JP2004/000059
§ 371 (c)(1),
(2), (4) Date: Mar. 24, 2006

(87) PCT Pub. No.: WO2004/063278
PCT Pub. Date: Jul. 29, 2004

(65) Prior Publication Data
US 2006/0217523 A1 Sep. 28, 2006

(30) Foreign Application Priority Data

Jan. 10, 2003 (JP) ................................. 2003-005007

(51) Int. Cl.
C08G 63/06 (2006.01)
C08G 63/46 (2006.01)
C08G 63/08 (2006.01)

(52) U.S. Cl. ...................................... 525/444; 525/450

(58) Field of Classification Search .................. 525/460, 525/450
See application file for complete search history.

(56) References Cited

U.S. PATENT DOCUMENTS

| | | | |
|---|---|---|---|
| 3,835,089 A | 9/1974 | Fox | |
| 4,565,851 A | 1/1986 | Barbee | |
| 4,729,927 A | 3/1988 | Hirose et al. | |
| 5,853,639 A * | 12/1998 | Kawakami et al. | 264/177.19 |
| 6,455,161 B1 * | 9/2002 | Regnier et al. | 428/412 |
| 6,498,217 B1 * | 12/2002 | Marek et al. | 525/433 |
| 6,673,403 B1 * | 1/2004 | Shiiki et al. | 428/35.7 |
| 7,153,587 B2 * | 12/2006 | Tan et al. | 428/480 |
| 7,713,464 B2 * | 5/2010 | Nakajima et al. | 264/513 |
| 2003/0125508 A1 * | 7/2003 | Yamane et al. | 528/354 |
| 2006/0204771 A1 * | 9/2006 | Tan et al. | 428/480 |

FOREIGN PATENT DOCUMENTS

| | | |
|---|---|---|
| EP | 0821 036 A1 | 1/1998 |
| EP | 939094 A2 | 9/1999 |
| EP | 1 050 559 A1 | 11/2000 |
| JP | 59-215319 A | 12/1984 |
| JP | 7-21107 B2 | 3/1995 |
| JP | 2001055497 A * | 2/2001 |
| JP | 2002264206 A * | 9/2002 |
| WO | WO 9810932 A1 * | 3/1998 |
| WO | WO-01/34886 A1 | 5/2001 |
| WO | WO-02/28969 A2 | 4/2002 |

OTHER PUBLICATIONS

Machine Translation of Tan JP2001-55497.*
Machine Translation of Sakurai JP 2002264206 A.*

* cited by examiner

Primary Examiner — Randy Gulakowski
Assistant Examiner — Mike M Dollinger
(74) Attorney, Agent, or Firm — Birch, Stewart, Kolasch & Birch, LLP

(57) ABSTRACT

There is provided by the present invention a polyester resin composition containing a copolyester having hydroxy carboxylic acid units as constituent units or a polyoxycarboxylic acid, wherein hydroxy carboxylic acid units of 5 or less carbon atoms are contained in amounts of 2 to 75% by mol based on 100% by mol of all the constituent units contained in the composition, and a molar ratio $S_{AA}$ of hydroxy carboxylic acid units both of whose neighboring units are hydroxy carboxylic acid units to all the hydroxy carboxylic acid units contained and a molar ratio $S_{BB}$ of hydroxy carboxylic acid units neither of whose neighboring units is a hydroxy carboxylic acid unit to all the hydroxy carboxylic acid units contained satisfy the following formula:

$$0.03 < S_{AA}/S_{BB} < 30.$$

In the present invention, the amount (% by mol) of the hydroxy carboxylic acid contained in the polymer is in the specific range, and a molar ratio $S_{AA}/S_{BB}$ of continuously bonded hydroxy carboxylic acid units to isolated hydroxy carboxylic acid units is in the specific range, and hence, a resin composition having excellent gas barrier properties and a good balance among mechanical properties, heat resistance, transparency and hue can be provided. The resin composition can be favorably used for packaging materials requiring gas barrier properties, for example, food packaging materials, such as films and blown contains, and electronic part packaging materials.

4 Claims, No Drawings

POLYESTER RESIN COMPOSITION

TECHNICAL FIELD

The present invention relates to a specific polyester resin composition containing a hydroxy carboxylic acid. More particularly, the invention relates to a hydroxy carboxylic acid-containing polyester resin composition which has a: specific bonding relation between a hydroxy carboxylic acid unit and its neighboring units and which is excellent in gas barrier properties, mechanical properties, transparency, hue and heat resistance.

BACKGROUND ART

When high-molecular weight materials are used for food packaging materials, these materials are desired to have low gas permeability in order to prevent change of properties of the contents. Of polyester resins, polyethylene terephthalate has been frequently employed for food packaging materials such as various beverage containers because it has an excellent balance between moldability, mechanical properties and gas barrier properties. However, even the polyethylene terephthalate resin is not always satisfactory in the gas barrier properties especially for food packaging materials requiring long-term storage properties.

In order to improve the gas barrier properties, studies of polyesters in which a hydroxy carboxylic acid is copolymerized, for example, polyglycolic acid, have been made. In U.S. Pat. No. 4,565,851, improvement of gas barrier properties by blending polyethylene terephthalate with polyglycolic acid is disclosed. Polyethylene terephthalate, however, has poor compatibility with polyglycolic acid. Therefore, it is difficult to obtain a transparent resin composition, and it is difficult to obtain a packaging material having excellent appearance.

In Japanese Patent Publication No. 21107/1995, a blend of a polyester that is obtained by copolymerizing a hydroxy carboxylic acid and an aromatic dicarboxylic acid with a polyethylene terephthalate component is used, but the polyethylene isophthalate containing a hydroxy carboxylic acid does not contain the hydroxy carboxylic acid in a sufficiently large amount, so that improvement of gas barrier properties of the resin composition is not satisfactory.

In Japanese Patent Laid-Open Publication No. 215319/1984, polyethylene terephthalate in which a hydroxy carboxylic acid is copolymerized is disclosed. This polyester is improved in the gas barrier properties of the polyethylene terephthalate, but in order to prepare the polyester, long time polycondensation under the conditions of high temperature and reduced pressure is necessary, so that it is difficult to copolymerize the hydroxy carboxylic acid in a high concentration, and besides, there resides a problem that the resulting polyester has poor hue and low heat resistance.

OBJECT OF THE INVENTION

It is an object of the present invention to provide a polyester resin composition improved in the gas barrier properties with maintaining excellent mechanical properties, hue, particularly transparency, and heat resistance which are almost on a level with crystalline polyesters.

Disclosure of the Invention

There is provided by the present invention a polyester resin composition containing a copolyester having hydroxy carboxylic acid units as constituent units or a polyoxycarboxylic acid, wherein hydroxy carboxylic acid units of 5 or less carbon atoms are contained in amounts of 2 to 75% by mol based on 100% by mol of all the constituent units contained in the composition, and a molar ratio $S_{AA}$ of hydroxy carboxylic acid units both of whose neighboring units are hydroxy carboxylic acid units to all the hydroxy carboxylic acid units contained and a molar ratio $S_{BB}$ of hydroxy carboxylic acid units neither of whose neighboring units is a hydroxy carboxylic acid unit to all the hydroxy carboxylic acid units contained satisfy the following formula:

$$0.03 < S_{AA}/S_{BB} < 30$$

A preferred embodiment of the polyester resin composition is a polyester resin composition obtained by melt mixing:

(A) a copolyester containing a hydroxy carboxylic acid or a polyoxycarboxylic acid in an amount of 1 to 50 parts by weight, with (B) a crystalline polyester (that is not identical with the component (A)) in an amount of 99 to 50 parts by weight, wherein a molar ratio $S_{AA}$ of hydroxy carboxylic acid units both of whose neighboring units are hydroxy carboxylic acid units to all the hydroxy carboxylic acid units contained and a molar ratio $S_{BB}$ of hydroxy carboxylic acid units neither of whose neighboring units is a hydroxy carboxylic acid unit to all the hydroxy carboxylic acid units contained satisfy the following formula:

$$0.03 < S_{AA}/S_{BB} < 30$$

Effect of the Invention

The present invention is a polyester resin composition wherein the amount (% by mol) of a hydroxy carboxylic acid contained in the polymer is in the specific range, and a molar ratio $S_{AA}/S_{BB}$ of continuously bonded hydroxy carboxylic acid units to isolated hydroxy carboxylic acid units is in the specific range. By virtue of the specific $S_{AA}/S_{BB}$ value, the polyester resin composition has excellent gas barrier properties and a good balance among mechanical properties, heat resistance, transparency and hue. The resin composition can be favorably used for packaging materials requiring gas barrier properties, for example, food packaging materials, such as films and blown containers, and electronic part packaging materials.

The polyester resin composition of the invention can be obtained preferably from a polyester resin obtained by copolymerizing or homopolymerizing a hydroxy carboxylic acid and a crystalline polyester resin.

BEST MODE FOR CARRYING OUT THE INVENTION

The polyester resin composition of the present invention is described in detail hereinafter.

The present invention provides a polyester resin composition containing a copolyester or a polyoxycarboxylic acid comprising hydroxy carboxylic acid units as constituent units or a polyoxycarboxylic acid, wherein hydroxy carboxylic acid units of 5 or less carbon atoms are contained in amounts of 2 to 75% by mol based on 100% by mol of all the constituent units contained in the composition, and a molar ratio $S_{AA}$ of hydroxy carboxylic acid units both of whose neighboring units are hydroxy carboxylic acid units to all the hydroxy carboxylic acid units contained and a molar ratio $S_{BB}$ of hydroxy carboxylic acid units neither of whose neighboring units is a hydroxy carboxylic acid unit to all the hydroxy carboxylic acid units contained satisfy the following formula:

$$0.03 < S_{AA}/S_{BB} < 30$$

The $S_{AA}/S_{BB}$ value is an indication of a proportion of blocks of continuously bonded hydroxy carboxylic acid units to isolated hydroxy carboxylic acid units in all of the hydroxy carboxylic acid units. The $S_{AA}/S_{BB}$ value is preferably a value of $0.03 < S_{AA}/S_{BB} < 30$, more preferably a value of $0.03 < S_{AA}/S_{BB} < 25$. The polyester resin composition having a $S_{AA}/S_{BB}$ value in this range has excellent gas barrier properties, high heat resistance and excellent transparency.

The $S_{AA}/S_{BB}$ value in the invention can be determined in the following manner. First, the polyester resin composition is subjected to NMR spectroscopy as it is or the polyester resin composition is hydrolyzed into monomer units and then subjected to NMR spectroscopy, to determine monomer units contained. Then, utilizing a phenomenon that chemical shifts of constituent units differ from each other depending upon their bonding patterns, namely, their neighboring monomer units, in a NMR spectrum of the polyester resin composition, the ratio between the bonding patterns can be determined from the signal intensity ratio.

Examples of the hydroxy carboxylic acids of 5 or less carbon atoms include glycolic acid, 4-hydroxy-n-butyric acid, 2-hydroxyisobutyric acid, 5-hydroxy-n-valeric acid and 3-hydroxypropionic acid. These acids may be used singly or in combination of two or more kinds. Further, lactic acid may be used as a part of the hydroxy carboxylic acids. Of these acids, glycolic acid and 3-hydroxypropionic acid are preferable, and glycolic acid is particularly preferable.

As the hydroxy carboxylic acid, a monomer of a hydroxy carboxylic acid, a cyclic monomer thereof or a cyclic or chain oligomer thereof may be employed. Examples of the oligomers include glycolide, lactide and various lactones.

The hydroxy carboxylic acid units of 5 or less carbon are desirably contained in amounts of preferably 2 to 75% by mol, more preferably 5 to 25% by mol, based on 100% by mol of all the constituent units contained in the composition.

The polyester resin composition of the invention can be obtained by melt mixing (A) a polyester copolymer containing hydroxy carboxylic acid units or a polyoxycarboxylic acid with (B) a crystalline polyester (that is not identical with the component (A)) in such a manner that a prescribed $S_{AA}/S_{BB}$ value is obtained. Although the polyester resin composition of the invention is a mixture of (A) the copolyester or the polyoxycarboxylic acid and (B) the crystalline polyester, it may be a polycondensate of (A) the copolyester or the polyoxycarboxylic acid and (B) the crystalline polyester.

The polyester resin composition of the invention obtained by the above process is described below in more detail.

(A) Hydroxy Carboxylic Acid Copolyester or Polyoxycarboxylic Acid

In the hydroxy carboxylic acid copolyester or the polyoxycarboxylic acid, hydroxy carboxylic acid units are contained in amounts of 45 to 100% by mol, preferably 50 to 99% by mol, more preferably 60 to 98% by mol, based on 100% by mol of all the constituent units contained. The residue is composed of a dicarboxylic acid and a diol.

As the dicarboxylic acid, an aromatic dicarboxylic acid is preferably employed, and as the diol, a diol of 4 or less carbon atoms is preferably employed. The constituent units of the polyoxycarboxylic acid are all composed of a hydroxy carboxylic acid.

Examples of the hydroxy carboxylic acids preferably employed include those previously described.

As the aromatic dicarboxylic acid, an aromatic dicarboxylic acid of 8 to 14 carbon atoms is employed. Examples of such acids include isophthalic acid, terephthalic acid, phthalic acid, 2,6-naphthalenedicarboxylic acid, 2,7-naphthalenedicarboxylic acid, 1,4-naphthlenedicarboxylic acid, 4,4'-sulfonebisbenzoic acid, 4,4'-biphenyldicarboxylic acid, 4,4'-sulfidobisbenzoic acid and 4,4'-oxybisbenzoic acid. Of these, isophthalic acid, terephthalic acid and 2,6-naphthalenedicarboxylic acid are preferably employed. These aromatic dicarboxylic acids may be used singly or in combination or two or more kinds.

Examples of the diols of 4 or less carbon atoms employable herein include ethylene glycol, diethylene glycol, 1,3-propanediol, 1,2-propanediol and 1,4-butanediol. These diols of 4 or less carbon atoms may be used singly or in combination or two or more kinds.

In the hydroxy carboxylic acid copolyester, the hydroxy carboxylic acid units, the aromatic dicarboxylic acid units and the diol units of 4 or less carbon atoms are desirably contained in the total amounts of preferably not less than 95% by mol, more preferably not less than 97% by mol, still more preferably not less than 99% by mol, based on 100% by mol of all the constituent units. In addition to these units, the following dicarboxylic acid constituent units and diol constituent units can be contained unless the composition deviates from the prescribed range.

Examples of the dicarboxylic acid units which may be contained include units of aliphatic dicarboxylic acids, such as oxalic acid, malonic acid, succinic acid, fumaric acid, maleic acid, glutaric acid, adipic acid, sebacic acid, azeraic acid and decanedicarboxylic acid; and units of alicyclic dicarboxylic acids, such as cyclohexanedicarboxylic acid. Examples of the diol units which may be contained include units of aliphatic diols, such as diethylene glycol, 1,2-propanediol, 1,3-propanediol, 1,4-butanediol, 1,6-hexanediol, neopentyl glycol, dodecamethylene glycol, triethylene glycol and tetraethylene glycol; units of alicyclic diols, such as cyclohexanedimethanol; and units of diols containing aromatic groups, such as 1,3-bis(2-hydroxyethoxy)benzene, 1,2-bis(2-hydroxyethoxy)benzene, 1,4-bis(2-hydroxyethoxy)benzene, bis[4-(2-hydroxyethoxy)phenyl]sulfone, 2,2-bis(4-β-hydroxyethoxyphenyl)propane, bisphenols, hydroquinone and resorcin.

In addition to the units of the above-mentioned hydroxy carboxylic acids, aromatic dicarboxylic acids and diols, units of monomers of 3 or more functional groups having ester-forming ability may be contained in amounts of 0.001 to 2% by mol, preferably 0.01 to 0.4% by mol, when needed.

Examples of the units of monomers of 3 or more functional groups include units derived from polyfunctional carboxylic acids having 3 or more carboxyl group, units derived from polyfunctional alcohols having 3 or more hydroxyl groups and units derived from polyfunctional hydroxy acids having 3 or more carboxyl groups and hydroxyl groups.

Of these, the units derived from polyfunctional alcohols having 3 or more hydroxyl groups are preferably contained. Examples of such units include units derived from glycerol, diglycerol, (trishydroxymethyl)methane, 1,1,1-(trishydroxymethyl)ethane, 1,1,1-(trishydroxymethyl)propane, pentaerythritol, dipentaerythritol, saccharides, such as sorbitol, glucose, lactose, galactose, fructose and saccharose, and nitrogen-containing polyhydric alcohols, such as 1,3,5-trishydroxyethoxycyanurate.

Of the above units, units derived from glycerol, 1,1,1-(trishydroxymethyl)ethane, 1,1,1-(trishydroxymethyl)propane, pentaerythritol and dipentaerythritol are more preferable.

In the present invention, the hydroxy carboxylic acid copolyester or the polyoxycarboxylic acid (A) has a reduced viscosity (IV) of usually 0.3 to 2.5, preferably 0.4 to 2.0, more preferably 0.5 to 1.5 (dl/g).

The glass transition temperature of the above polyester is desired to be in the range of usually 20 to 90° C., preferably 25 to 80° C., more preferably 30 to 70° C.

In the present invention, the oxycarboxylic acid copolyester or the polyoxycarboxylic acid (A) may be any of polyester resins prepared by publicly known processes provided that it has excellent gas barrier properties, transparency and mechanical properties.

For example, the hydroxy carboxylic acid, the aromatic dicarboxylic acid and the diol of 4 or less carbon atoms may be esterified and then subjected to melt polycondensation, or the hydroxy carboxylic acid, the aromatic dicarboxylic acid and the diol of 4 or less carbon atoms may be subjected to transesterification and then subjected to melt polycondensation, or a cyclic oligomer of the hydroxy carboxylic acid may be subjected to ring opening polymerization. The polyester obtained by these processes may be subjected to solid phase polymerization. Of these processes, preferable is a preparation process using melt polycondensation because various components can be copolymerized.

As one example of the process for preparing hydroxy carboxylic acid copolyesters, a process comprising performing esterification or transesterification to prepare a low polymer, subjecting the low polymer to melt polycondensation and then further subjecting the polycondensate to solid phase polymerization to increase its molecular weight is given below.

For the esterification of the hydroxy carboxylic acid, the aromatic dicarboxylic acid and the diol of 4 or less carbon atoms, given amounts of the hydroxy carboxylic acid, the aromatic dicarboxylic acid and ethylene glycol are directly esterified at the same time or successively at a temperature of preferably 130 to 220° C. under pressure or at atmospheric pressure.

The hydroxy carboxylic acid employable herein may be any of a hydroxy carboxylic acid, a cyclic monomer of a hydroxy carboxylic acid, a cyclic oligomer thereof or a chain oligomer thereof, as previously described.

For carrying out the above reaction, it is desirable to fed the diol starting material in an amount of 1.01 to 3.5 mol, preferably 1.1 to 3.0 mol, and the hydroxy carboxylic acid starting material in an amount of 1.35 to 198 mol, preferably 3 to 98 mol, based on 1 mol of the dicaboxylic acid starting material.

The esterification reaction may be carried out without adding any catalyst or may be carried out in the presence of a catalyst, for example, an acid, such as concentrated sulfuric acid or p-toluenesulfonic acid, or a metal complex. However, it is preferable to carry out the esterification in the absence of a catalyst.

For the transesterification of the hydroxy carboxylic acid ester, the aromatic dicarboxylic acid ester and the diol of 4 or less carbon atoms, given amounts of the oxycarboxylic acid ester, the aromatic dicarboxylic acid ester and the diol of 4 or less carbon atoms are transesterified at a temperature of 130 to 220° C. at atmospheric pressure with distilling off a lower monoalcohol.

For carrying out the above reaction, it is desirable to fed the diol starting material in an amount of 1.01 to 4 mol, preferably 1.2 to 3.2 mol, and the hydroxy carboxylic acid ester starting material in an amount of 1.35 to 198 mol, preferably 3 to 98 mol, based on 1 mol of the dicarboxylic acid starting material.

The transesterification reaction is usually carried out in the presence of various metal complexes, such as manganese acetate and zinc acetate.

Then, the low polymer obtained by the above process is subjected to melt polycondensation in the presence of a polymerization catalyst and a stabilizer in the temperature range of 150 to 250° C., preferably 190 to 230° C., under reduced pressure conditions of not more than 10 Torr, preferably not more than 2 Torr, for a period of 1 hour to 24 hours, preferably 2 hours to 12 hours, with stirring and distilling off a diol such as a diol of 4 or less carbon atoms and a component mainly containing a hydroxy carboxylic acid, whereby a prescribed polyester resin can be prepared.

Examples of the polymerization catalysts include alkali metals, such as sodium; alkaline earth metals, such as magnesium; metals, such as aluminum, zinc, tin, titanium, copper, nickel, cobalt, zirconium, germanium, iron, antimony and vanadium; and organic complexes or oxides of these metals. Of these, organic complexes or oxides of transition metals, such as zinc, tin, titanium, cobalt, germanium and antimony, are preferable, and germanium dioxide is particularly preferable.

The above reaction may be carried out in the presence of various stabilizers, coloring inhibitors and hydrolysis inhibitors. Examples of the stabilizers and the coloring inhibitors include phosphorus compounds and hindered phenol compounds.

Of these compounds, phosphorus compound are particularly preferably contained. Examples of the phosphorus compounds include inorganic phosphorus compounds, such as phosphoric acid, phosphorous acid and polyphosphoric acid; phosphoric acid ester compounds, such as trimethyl phosphate and diphenyl phosphate; and phosphorous acid ester compounds, such as triphenyl phosphite and tris(2,4-di-t-butylphenyl)phosphite.

When the melt polycondensation is carried out in the temperature range of 150 to 250° C., preferably at a low temperature of 190 to 230° C., only small amount of an oligomer is distilled off. Therefore, polymerization can be effected efficiently, and a polyester resin having a sufficiently high molecular weight can be obtained.

For synthesizing the polyoxycarboxylic acid, polycondensation of a hydroxy carboxylic acid has only to be carried out without introducing diol units.

When the resulting hydroxy carboxylic acid copolyester or polyoxycarboxylic acid has crystallizability, it can be subjected to solid phase polymerization. For the solid phase polymerization, a publicly known process is adoptable. For example, the hydroxy carboxylic acid copolyester or the polyoxycarboxylic acid is maintained in the temperature range of 80° C. to a temperature lower by 30° C. than the melting peak-temperature for a period of 1 to 300 minutes under reduced pressure or in an inert gas atmosphere to perform precrystallization and then maintained in the temperature range of 130° C. to a temperature lower by 10° C. than the melting peak temperature for a period of 1 to 100 hours to perform solid phase polymerization, whereby a high-molecular weight copolyester can be prepared.

(B) Crystalline Polyester

The crystalline polyester (B) (that is not identical with the component (A)) for the invention is obtained by copolymerizing a dicarboxylic acid and a diol. Examples of the polyesters include aromatic crystalline polyesters, such as polyethylene terephthalate, polytrimethylene terephthalate, polybutylene terephthalate, polyhexamethylene terephthalate, polyethylene-2,6-naphthalate, polytrimethylene-2,6-naphthalate, polybutylne-2,6-naphthalate, polyhexamethylene-2,6-naphthalate, polyethylene isophthalate, polytrimethylene isophthalate, polybutylene isophthalate, polyhexamethylene isophthalate, poly-1,4-cyclohexanedimethanol terephthalate and polybutylene adipate terephthalate; and aliphatic crystalline polyesters, such as polylactic acid, polybutylene succinate, polyethylene adipate, polybutylene adipate and polybutylene adipate succinate.

It is desirable that these polyesters do not substantially contain a hydroxy carboxylic acid.

As the aromatic crystalline polyester, polyalkylene phthalate, such as polyethylene terephthalate, polytrimethylene terephthalate, polybutylene terephthalate or polyethylene isophthalate, is particularly preferably employed. Polyethylene-2,6-naphthalate is also preferably employed.

As the aliphatic crystalline polyester, polylactic acid is preferable. Examples of the polylactic acids include polylactic acid and copolylactic acids, such as a lactic acid/ hydroxy carboxylic acid copolymer and a lactic acid/aliphatic polyhydric alcohol/aliphatic polybasic acid copolymer.

As the starting materials of the polylactic acids, lactic acids and hydroxy carboxylic acids, aliphatic polyhydric alcohols, aliphatic polybasic acids, etc. are employable. Examples of the lactic acids include L-lactic acid, D-lactic acid, DL-lactic acid, mixtures thereof, and lactide that is a cyclic dimer of lactic acid.

The aromatic or aliphatic crystalline polyester (B) may be a polyester wherein other aromatic or aliphatic dicarboxylic acid units or diol units are copolymerized, unless the crystallizability is deteriorated. Further, small amounts of units of trifunctional monomers, namely, units having 3 or more hydroxyl groups or carboxyl groups, may be copolymerized.

Examples of the dicarboxylic acid units which may be contained include units of aromatic dicarboxylic acids, such as phthalic acid, isophthalic acid, 2,6-naphthalenedicarboxylic acid, 2,7-naphthalenedicarboxylic acid, 1,4-naphthalenedicarboxylic acid, 4,4'-sulfonebisbenzoic acid, 4,4'-biphenyldicarboxylic acid, 4,4'-sulfidobisbenzoic acid, 4,4'-oxybisbenzoic acid and diphenoxyethanedicarboxylic acid; units of aliphatic dicarboxylic acids, such as malonic acid, succinic acid, glutaric acid, fumaric acid, maleic acid, adipic acid, sebacic acid, azeraic acid and decanedicarboxylic acid; and units of alicyclic dicarboxylic acids, such as cyclohexanedicarboxylic acid.

Examples of the diol units which may be contained include units of aliphatic diols, such as diethylene glycol, 1,2-propanediol, 1,3-propanediol, 1,4-butanediol, 1,6-hexanediol, neopentyl glycol, dodecamethylene glycol, triethylene glycol and tetraethylene glycol; units of alicyclic diols, such as cyclohexanedimethanol; and units of diols containing aromatic groups, such as 1,3-bis(2-hydroxyethoxy)benzene, 1,2-bis(2-hydroxyethoxy)benzene, 1,4-bis(2-hydroxyethoxy)benzene, bis[4-(2-hydroxyethoxy)phenyl]sulfone, 2,2-bis(4-β-hydroxyethoxyphenyl)propane, bisphenols, hydroquinone and resorcin.

Such crystalline polyesters (B) as mentioned above may be used singly or in combination of plural kinds. The crystalline polyester (B) may be any of polyesters prepared by processes generally used for preparing usual polyester resins. For example, the polyester may be a polyester prepared by solution polycondensation. Further, the crystalline polyester (B) may be a polyester obtained by solid phase polymerization.

The crystalline polyester (B) has an intrinsic viscosity [η], as measured in a tetrachloroethane/phenol (1/1) mixed solvent at 25° C., of not less than 0.4 dl/g, preferably 0.5 to 2.0 dl/g.

In the present invention, crystallizability of the polyester (B) is judged by whether a melting peak is observed or not by DSC (differential scanning calorimeter). The melting peak of DSC is measured in the following manner. A resin composition is temporarily melted in a stream of nitrogen or helium at atmospheric pressure at a temperature at which melt molding is feasible, then rapidly cooled down to room temperature at a cooling rate of about −10° C./min to solidify the composition and then heated to the melting temperature again at a heating rate of 10° C./min. The melting peak temperature is preferably in the range of 50 to 300° C. From an area of the peak measured, heat of fusion can be determined, and the heat of fusion ΔHfb of the polyester is preferably not less than 1 J/g, more preferably not less than 10 J/g.

As the crystalline polyester (B), a polyester that is recycled after use, particularly a recycled polyethylene terephthalate resin, can also be preferably employed.

Polyester Resin Composition

The polyester resin composition of the invention contains a copolyester containing hydroxy carboxylic acid units as constituent units or a polyoxycarboxylic acid and has a $S_{AA}/S_{BB}$ value of specific range.

A preferred embodiment of the polyester resin composition is a polyester resin composition obtained by melt mixing:

(A) the copolyester containing a hydroxy carboxylic acid or the polyoxycarboxylic acid in an amount of 1 to 50 parts by weight, preferably 3 to 45 parts by weight, more preferably 5 to 40 parts by weight, with (B) the crystalline polyester (that is not identical with the component (A)) in an amount of 99 to 50 parts by weight, preferably 97 to 55 parts by weight, more preferably 95 to 60 parts by weight, in such a manner that a prescribed $S_{AA}/S_{BB}$ value is obtained.

The gas barrier properties of the polyester resin composition of the invention tend to be improved as the amount of the hydroxy carboxylic acid contained is increased. In the copolyester containing a hydroxy carboxylic acid or the polyoxycarboxylic acid (A) for use in the invention, hydroxy carboxylic acid constituent units are copolymerized in a high concentration of 45 to 100% by mol, and therefore, the mere addition of a small amount of the component (A) to the component (B) enables appearance of excellent gas barrier properties. That is to say, the amount of the polyester added to improve gas barrier properties of the crystalline polyester (B) is smaller in the case where the polyester (A) of the invention in which hydroxy carboxylic acid units are copolyemrized in a high concentration is added, as compared with a case where a polyester in which hydroxy carboxylic acid units are copolymerized in a low concentration that deviates from the range of the invention is added, and therefore, the gas barrier properties can be improved without deteriorating characteristics inherent in the crystalline polyester (B), such as heat resistance, moldability and mechanical strength.

A method of calculating the $S_{AA}/S_{BB}$ value in the invention is described below using a polyester resin composition obtained from (A) a polyester resin constituted of glycolic acid units (referred to as "GA" hereinafter), isophthalic acid units (referred to as "IA" hereinafter) and ethylene glycol units (referred to as "EG" hereinafter), and (B) polyethylene terephthalate constituted of terephthalic acid units (referred to as "TA" hereinafter) and ethylene glycol units (referred to as "EG" hereinafter).

In this resin composition, GA can be bonded to GA, IA or TA on the hydroxyl group side and can be bonded to GA or EG on the carboxyl group side. When a signal of methine carbon of GA is noted in the $^{13}$C-NMR spectrum, the signal is split into four kinds of (1) GA-GA-GA, (2) EG-GA-GA, (3) GA-GA-IA and GA-GA-TA, and (4) EG-GA-IA and EG-GA-TA according to differences of the neighboring groups. The signal intensity ratios correspond to molar ratios of GA units having different neighboring groups, and the above four kinds are represented by $S_1$, $S_2$, $S_3$ and $S_4$, respectively. That is to say, the proportion of GA units both of whose neighboring units are GA units to all the GA units is $S_1$, and the proportion of GA units neither of whose neighboring units is a GA unit to all the GA units is $S_4$, so that $S_{AA}=S_1$ and $S_{BB}=S_4$. Even if the hydroxy carboxylic acid unit is a unit other than a glycolic acid unit, the $S_{AA}/S_{BB}$ value can be calculated in the same manner as described above.

The polyester resin composition of the invention preferably has a carbonic acid gas permeability constant satisfying the following formula 1:

$$Pc<(Pb+Pa\cdot F)/(1+F) \quad \text{(formula 1)}$$

wherein Pa and Pb denote a carbonic acid gas permeability constant of the hydroxy carboxylic acid copolyester or the polyoxycarboxylic acid (A) and a carbonic acid gas permeability constant of the crystalline polyester (B), respectively, and F is represented by the following formula 2:

$$F=3\Phi a\cdot Pb/(1-\Phi a)(2Pb+Pa) \quad \text{(formula 2)}$$

wherein $\Phi a$ denotes a volume fraction of the polyester resin (A).

The right-hand member of the formula 1 is a formula (Maxwell's formula, L. M. Robeson, et al., Die Angew. Makromol. Chem. 29/30, 47(1873)) to numerically determine a gas permeability constant of a two-component model in which a spherical component (A) is dispersed in a component (B) that is a matrix phase. The gas permeability constant Pc of the polyester resin composition, said constant being in the range of the invention, is smaller than a value estimated from the Maxwell's formula, and therefore, the component (A) and the component (B) are moderately transesterified to take a form of a block copolymer. Consequently, it can be thought that the gas barrier properties of the polyester resin composition of the invention are improved as compared with those of a simple mixture.

The carbonic acid gas permeability constant of the polyester resin composition of the invention is a value measured in the following manner. A given amount of the polyester resin composition having been sufficiently vacuum dried is interposed between two brass plates, aluminum plates and release films, then melted at 280° C., compressed at 10 MPa for 1 minute and then compressed again at 10 MPa with cooling by a compression molding machine set at 0° C. to obtain a pressed film having a thickness of 50 to 100 μm. Then, using a carbonic acid gas of atmospheric pressure as a measuring gas, a gas permeability constant of the film is measured at 25° C. by means of a gas permeability tester, for example, a G.L. Science GPM-250 device.

The polyester resin composition of the invention has a haze of preferably not more than 20, more preferably not more than 5, and a hue (b value) of preferably not more than 15, more preferably not more than 10.

The haze of the polyester resin composition of the invention is a value measured in the following manner. A given amount of the polyester resin composition having been sufficiently vacuum dried is interposed between two brass plates, aluminum plates and release films, then melted at 280° C., compressed at 10 MPa for 1 minute and then compressed again at 10 MPa with cooling by a compression molding machine set at 0° C. to obtain a pressed sheet having a thickness of about 200 μm. Then, a haze of the sheet is measured in accordance with JIS K-7105. The hue (b value) of the polyester resin composition is a value measured in the following manner. The above-obtained sheet having a thickness of about 200 μm is fixed on a Teflon (registered trademark) sheet having a thickness of 2 mm to obtain a reflection spectrum, and hue obtained from the reflection spectrum is measured by means of a hue meter, for example, a Minolta Camera spectrocolorimeter CM-1000 model.

Preparation of Polyester Resin Composition

The polyester resin composition of the invention can be obtained by melt mixing (A) the hydroxy carboxylic acid copolyester or the polyoxycarboxylic acid with (B) the crystalline polyester. After the melt mixing, solid phase polymerization may be further carried out.

The temperature for the melt mixing is not specifically restricted provided that it is not lower than a flow temperature of the hydroxy carboxylic acid copolyester or the polyoxycarboxylic acid (A) and not lower than a melting point of the crystalline polyester (B), but the temperature is desired to be in the range of 180 to 300° C., preferably 220 to 290° C. The melt mixing time is in the range of preferably 30 seconds to 4 hours, more preferably 1 minute to 2 hours.

Examples of apparatuses to carry out the melt mixing include a single-screw extruder, a twin-screw extruder, a plastomill, a kneader, and a reactor equipped with a stirring device and a pressure-reducing device. It is desirable to carry out the melt mixing in an inert gas atmosphere and/or under reduced pressure.

Of the above apparatuses, a twin-screw extruder having a device capable of freely changing a feed rate is preferably used for the melt mixing. When such an apparatus is used, a feed rate can be controlled, and thereby the melt mixing time of the polyester resin composition can be controlled. Hence, a polyester resin composition having an optimum $S_{AA}/S_{BB}$ value can be continuously obtained.

The mixing of the hydroxy carboxylic acid copolyester or the polyoxycarboxylic acid (A) with the crystalline polyester (B) may be carried out in the presence of a catalyst or a stabilizer. The catalyst or the stabilizer may be added in advance to the hydroxy carboxylic acid copolyester or the polyoxycarboxylic acid (A) or the crystalline polyester (B) or may be added during the melt mixing process. Examples of the catalysts include alkali metals; alkaline earth metals; metals, such as manganese, zinc, tin, cobalt, titanium, antimony and germanium; and organic or inorganic compounds containing these metals. Examples of the stabilizers and coloring inhibitors include phosphorus compounds and hindered phenol compounds.

Of the above compounds, phosphorus compounds are particularly preferable. Examples of the phosphorus compounds include inorganic phosphorus compounds, such as phosphoric acid, phosphorous acid and polyphosphoric acid; phosphoric acid ester compounds, such as trimethyl phosphate and diphenyl phosphate; and phosphorous acid ester compounds, such as triphenyl phosphite and tris(2,4-di-t-butylphenyl) phosphite. When such a phosphorus compound is contained, the resin composition is excellent in at least hue.

In the melt mixing of the hydroxy carboxylic acid copolyester or the polyoxycarboxylic acid (A) with the crystalline polyester (B), a coupling agent having reactivity to both the polyesters may be used in an appropriate amount. The coupling agent is a compound having two or more groups having reactivity to a hydroxyl group or a carboxyl group at the end of the polyester. Examples of the groups having reactivity to a hydroxyl group or a carboxyl group at the end of the polyester include acid anhydride group, isocyanate group, epoxy group, oxazoline group and carbodiimide group. Examples of the compounds having these groups include pyromellitic anhydride, tolylene diisocyanate, hexamethylene diisocyanate, xylylene diisocyanate, diphenylmethane diisocyanate, ethylene glycol diglycidyl ether, resorcinol diglycidyl ether and bisoxazoline.

The melt mixing conditions (melting conditions, such as melting temperature, melting time and melt mixing apparatus, mixing conditions, etc.) to obtain the prescribed $S_{AA}/S_{BB}$ value are appropriately determined depending upon the mixing ratio between the hydroxy carboxylic acid copolyester or the polyoxycarboxylic acid (A) and the crystalline polyester (B), compositions thereof, molecular weights thereof, and presence of a catalyst, a stabilizer and a coupling agent.

For example, when polyethylene terephthalate having IV of 0.8 dl/g and a hydroxy carboxylic acid copolyester or a polyoxycarboxylic acid composed of a glycolic acid/isophthalic acid/ethylene glycol copolymer (glycolic acid content: 70% by mol) having IV of 0.8 dl/g are mixed in a weight ratio of 90:10 by the use of an apparatus for performing melt mixing at atmospheric pressure, such as a labo-plastomill or a twin-screw extruder, the melt mixing is desirably carried out at a temperature of 280° C. for a period of 5 minutes to 15 minutes. When a polyester having a high copolymerization ratio of a hydroxy carboxylic acid, e.g., polyglycolic acid, is used, the melt mixing is desirably carried out for a longer period of time. When the molecular weight of the hydroxy carboxylic acid copolyester or the polyoxycarboxylic acid (A) and/or the crystalline polyester (B) is higher than the above value, the melt mixing is desirably carried out for a longer period of time. When a catalyst is absent or deactivated, the melt mixing is desirably carried out for a longer period of time. Also when a stabilizer such as a phosphoric acid ester is present, the melt mixing is desirably carried out for a longer period of time. Under stronger kneading conditions, the melt mixing is desirably carried out for a shorter period of time.

In order to efficiently obtain a polyester resin composition having a $S_{AA}/S_{BB}$ value defined by the present invention for a shorter period of time, it is desirable to select the polyester resins (A) and (B) which are more reactive to each other. For example, when polyethylene terephthalate is used as the component (B), it is preferable to select, as the component (A), a hydroxy carboxylic acid copolymer wherein an aromatic dicarboxylic acid group, such as an isophthalic acid group or a 2,6-naphthalenedicarboxylic acid group, is copolymerized.

The polyester resin composition obtained by the melt mixing may be maintained at a temperature of not higher than its melting point for a period of 20 minutes to 400 hours under reduced pressure or in a stream of an inert gas to perform solid phase polymerization. For the solid phase polymerization, a publicly known process is adoptable. For example, pellets, flakes or a powder of the polyester resin composition is maintained in the temperature range of 80° C. to a temperature lower by 30° C. than the melting peak temperature for a period of 1 to 300 minutes in an inert gas atmosphere to perform precrystallization and then maintained in the temperature range of 130° C. to a temperature lower by 10° C. than the melting peak temperature for a period of 20 minutes to 400 hours, preferably 1 hour to 100 hours, more preferably 2 hours to 50 hours, to perform solid phase polymerization. The resin composition having been subjected to solid phase polymerization has an increased molecular weight to contribute to improvement of mechanical strength and has a decreased content of a low-molecular weight component. Therefore, it is preferable to carry out solid phase polymerization.

By carrying out the solid phase polymerization, further, transesterification reaction is promoted. Hence, even in case of a resin composition prepared by melt mixing for a shorter period of time than the aforesaid preferred period of time and having a $S_{AA}/S_{BB}$ value deviating from the range of the invention, the reaction can be promoted by performing the solid phase polymerization to obtain a $S_{AA}/S_{BB}$ value in the range of the invention, whereby the properties of the resin composition can be enhanced.

By performing melt mixing or by performing melt mixing and then solid phase polymerization as described above, the polyester resin composition can be readily imparted with gas barrier properties, etc., with keeping mechanical strength, heat resistance and transparency of the crystalline polyester. Moreover, a polyester resin composition having higher heat resistance and better hue than a copolyester having the same composition but having been random polymerized too much can be obtained.

EXAMPLES

The present invention is further described with reference to the following examples, but it should be construed that the invention is in no way limited to those examples.

Methods for measuring properties and indications in the present invention are as follows.

(1) Composition

Composition of a polyester resin was determined by measuring monomer units contained in the polyester resin by NMR spectroscopy.

A method to determine the composition is given below taking the later-described Preparation Example 1 as an example.

Composition of the hydroxy carboxylic acid copolyester was determined by measuring a 270 MHz proton nuclear magnetic resonance spectrum of a solution of the polyester in deuterated chloroform.

Assignments of signals are as follows.

$\delta$3.5-4.0 ppm (0.67H, ether oxygen neighboring methylene of diethylene glycol unit)

$\delta$4.1-5.1 ppm (13.38H, methylene of glycolic acid unit, methylene of ethylene glycol unit, and ether oxygen non-neighboring methylene of diethylene glycol unit)

$\delta$7.4-8.8 ppm (4.OH, cyclic proton of isophthalic acid unit)

The monomer proportions were calculated in the following manner from integrated intensity ratios of signals.

$DEG=0.67/4=0.17$ unit $IA=4.0/4=1.0$ unit $EG=IA-DEG=1.0-0.17=0.83$ unit $GA=(13.38-4EG-4DEG)/2=(13.38-3.33-0.67)/2=4.69$ unit Consequently, the following is given.

$GA/IA/EG/DEG=4.69/1.0/0.83/0.17$ unit$=70.1/15.0/12.5/2.5$ mol %

Also in Preparation Example 2, Preparation Example 3 and Preparation Example 5, assignments of signals are the same as above, and the monomer proportions were determined in the same manner as described above.

Constitution (composition) of the polyester resin composition was anticipated from the compositions of the mixed polyester resins with some exceptions.

(2) $S_{AA}/S_{BB}$

A $S_{AA}/S_{BB}$ value was determined as an intensity ratio of a signal showing a bonding pattern wherein both of neighboring units of a hydroxy carboxylic acid unit are hydroxy carboxylic acid units in a NMR spectrum to a signal showing a bonding pattern wherein neither of neighboring units of a hydroxy carboxylic acid unit is a hydroxy carboxylic acid unit in a NMR spectrum.

In case of a polyester resin composition obtained from a copolyester (A) constituted of GA, IA, EG and DEG and a crystalline polyester (B) constituted of TA, EG and DEG, a 61-62 ppm region, in which central carbon of glycolic acid is observed, is noted in a $^{13}$C-NMR spectrum of the polyester resin composition as measured in a mixed solvent of deuterated chloroform and deuterated trifluoroacetic acid. In this region, a signal of the same glycolic acid carbon is split according to the neighboring units, and there are observed broadly split four kinds, namely, 61.27 ppm, 61.40 ppm, 61.53 ppm and 61.72 ppm. These are assigned to (1) GA-GA-GA, (2) EG(and DEG)-GA-GA, (3) GA-GA-IA or GA-GA-TA, and (4) EG(and DEG)-GA-IA or EG(and DEG)-GA-TA, respectively. The $S_{AA}/S_{BB}$ value was determined as an intensity ratio of the signal (1) to the signal (4).

Also regarding a polyester resin composition having different constitution (composition), the $S_{AA}/S_{BB}$ value can be determined in the same manner as described above.

(3) Reduced Viscosity

A reduced viscosity IV of a polyester or a polyester resin composition was measured in a mixed solvent of phenol/tetrachloroethane (1/1 by weight) at 25° C.

(4) Melting Peak Temperature

A melting peak temperature of a polyester resin composition was measured by the use of a differential scanning calorimeter DSC-7 model (manufactured by Perkinelmer). Specifically, from a resin composition sufficiently dried in advance, 10 mg of a sample was weighed into a sample pan, heated up to 280° C. from room temperature in a nitrogen atmosphere at a heating rate of 320° C./min, maintained at 280° C. for 5 minutes, rapidly cooled down to 20° C. at a cooling rate of 320° C./min, maintained at 20° C. for 10 minutes and then heated up to 280° C. at a heating rate of 10° C./min, and in this process, measurement was carried out. By the use of analysis software attached to the device, a melting peak temperature was determined.

(5) Gas Barrier Properties (5-1) Carbonic acid gas permeability constant

Using a pressed film having a thickness of 50 to 100 μm obtained by rapidly cooling a resin or a resin composition in a molten state to not higher than 0° C., a carbonic acid gas permeability constant was measured at 25° C. by means of a G.L. Science GPM-250 device.

(5-2) (Pb+Pa−F)/(1+F)

A density of each component was measured by a density gradient tube (23° C.). Using the measured density, a volume fraction Φa of the polyester resin (A) was determined, and from the volume fraction and the carbonic acid gas permeability constants Pa and Pb, a (Pb+Pa·F)/(1+F) value was calculated.

In Preparation Example 1, the density of (A1) was 1420 kg/m³; in Preparation Example 2, the density of (A2) was 1407 kg/m³; in Preparation Example 3, the density of (A3) was 1501 kg/m³; in Preparation Example 4, the density of (PGA) was 1590 kg/m³; and in Preparation Example 5, the density of (A4) was 1369 kg/m³ and the density of (B)PET was 1339 kg/m³.

(6) Transparency

Using a pressed film having a thickness of 200 μm obtained by rapidly cooling a polyester resin composition in a molten state to not higher than 0° C., transparency was measured at 23° C. by means of a Nippon Denshoku haze meter.

(7) Hue

A pressed film having a thickness of 200 μm was fixed on a Teflon (registered trademark) sheet having a thickness of 2 mm, and hue (b value) of the film was measured by means of a Minolta Camera spectrocolorimeter CM-1000 model.

Preparation Example 1

In a reaction vessel, 376.2 g (4.95 mol) of glycolic acid, 111.0 g (0.70 mol) of isophthalic acid and 95.4 g (1.54 mol) of ethylene glycol were placed, and they were subjected to esterification reaction at 130 to 200° C. in a nitrogen atmosphere at atmospheric pressure for about 13 hours until the reaction product became transparent, with stirring and distilling off water produced.

The resulting polyester oligomer was introduced into a glass reactor equipped with a stirring device and a distilling tube. The distilling tube is connected to a vacuum device consisting of a vacuum pump and a reduced pressure controller and has a structure capable of distilling off evaporated matters. To the system, 2.10 g of a germanium type catalyst (germanium dioxide content: 6.7% by weight) was added. The reaction was carried out at 200° C. for about 30 minutes in a stream of nitrogen with stirring, then the system was heated up to 220° C. over a period of about 4 hours, and the temperature was maintained at 220° C. until the reaction was completed. Simultaneously with the beginning of heating, the pressure of the system was reduced to about 0.8 Torr over a period of about 1 hour, and thereafter, the pressure was maintained at about 0.8 to 0.5 Torr. The reaction was carried out for about 11.5 hours from the beginning of the pressure reduction, and ethylene glycol and the like produced were distilled off from the system. During the polycondensation reaction, viscosity of the reaction product increased with time, and a copolyester (A1) was obtained.

The copolyester (A1) thus obtained had a reduced viscosity IV of 0.829 dl/g. The proportions of constituent units of glycolic acid, isophthalic acid, ethylene glycol and diethylene glycol in the copolyester (A1) were 70.1% by mol, 15.0% by mol, 12.5% by mol and 2.5% by mol, respectively.

The copolyester was dried at about 40° C. for about 20 hours under reduced pressure, and a given amount of the polyester was interposed between two brass plates, aluminum plates and release films, then melted at 200° C., compressed at 10 MPa for 1 minute and then compressed again at 10 MPa with cooling by a compression molding machine set at 20° C. to obtain a pressed film having a thickness of about 70 μm. Then, gas barrier properties of the film were measured. As a result, the carbonic acid gas permeability constant was 0.74 cm³·mm/(m²/day·atom).

Preparation Example 2

In a similar manner to that of Preparation Example 1, 250.0 g (3.29 mol) of glycolic acid, 136.5 g (0.82 mol) of isophthalic acid and 117.3 g (1.89 mol) of ethylene glycol were placed, and they were subjected to esterification reaction in a prescribed manner (for 9 hours). Thereafter, 1.82 g of a germanium type catalyst (germanium dioxide content: 6.7% by weight) was added, and the reaction was carried out for 9.5 hours in a prescribed manner to obtain a copolyester (A2).

The proportions of constituent units of glycolic acid, isophthalic acid, ethylene glycol and diethylene glycol in the copolyester (A2) were 58.9% by mol, 20.5% by mol, 16.1% by mol and 4.4% by mol, respectively. Then, gas barrier properties of the copolyester (2) were measured in the same manner as in Preparation Example 1. As a result, the carbonic acid gas permeability constant was 1.1 $cm^3 \cdot mm/(m^2/day \cdot atom)$.

Preparation Example 3

In a similar manner to that of Preparation Example 1, 1490 g (19.6 mol) of glycolic acid, 33 g (0.2 mol) of isophthalic acid and 16 g (0.26 mol) of ethylene glycol were placed, and they were subjected to esterification reaction in a prescribed manner (for 9 hours). Thereafter, 8.8 g of a germanium type catalyst (germanium dioxide content: 6.7% by weight) was added, and the reaction was carried out for 5 hours in a prescribed manner. The proportions of constituent units of glycolic acid, isophthalic acid, ethylene glycol and diethylene glycol in the copolyester (A3) were 98.0% by mol, 1.0% by mol, 0.9% by mol and 0.1% by mol, respectively. Then, gas barrier properties of the copolyester (3) were measured in the same manner as in Preparation Example 1. As a result, the carbonic acid gas permeability constant was 0.15 $cm^3 \cdot mm/(m^2/day \cdot atom)$.

Preparation Example 4

In a glass reactor equipped with a stirring device and a distilling tube, a chloroform solution containing 120 g of glycolide (available from Boehringer Ingelheim Co.) and 72 mg of lauryl alcohol and a chloroform solution containing 36 mg of tin chloride were placed, and the reactor was thoroughly purged with a nitrogen gas. Thereafter, the system was stirred and heated at 180° C. and atmospheric pressure. In about 1 hour, the contents of the system solidified, so that stirring was stopped, and then heating was continued for 1 hour. Thereafter, the system was heated to 250° C. to melt the solid. Thus, a polyglycolic acid (PGA) was obtained. Then, gas barrier properties of the polyglycolic acid (PGA) were measured in the same manner as in Preparation Example 1. As a result, the carbonic acid gas permeability constant was 0.1 $cm^3 \cdot mm/(m^2/day \cdot atom)$.

Preparation Example 5

In a similar manner to that of Preparation Example 1, 152 g (2 mol) of glycolic acid, 166 g (1 mol) of isophthalic acid and 279 g (4.5 mol) of ethylene glycol were placed, and they were subjected to esterification reaction in a prescribed manner (for 12 hours). Thereafter, 1.5 g of a germanium type catalyst (germanium dioxide content: 6.7% by weight) was added, and the reaction was carried out for 8 hours in a prescribed manner. The proportions of constituent units of glycolic acid, isophthalic acid, ethylene glycol and diethylene glycol in the copolyester (A4) were 19.7% by mol, 40.2% by mol, 33.9% by mol and 6.2% by mol, respectively. Then, gas barrier properties of the copolyester (4) were measured in the same manner as in Preparation Example 1. As a result, the carbonic acid gas permeability constant was 2.2 $cm^3 \cdot mm/(m^2/day \cdot atom)$.

Example 1

90 Parts by weight of commercially available polyethylene terephthalate (Tm: 252° C., [η]: 0.82 dl/g) having been sufficiently dried by a vacuum dryer and 10 parts by weight of the copolyester (A1) prepared in Preparation Example 1 were mixed by a tapered twin-screw extruder of 30 to 20 mm diameter (manufactured by Haake) at a cylinder temperature of 280° C., and a feed rate was controlled so as to maintain the mixture in a transparent state. Thus, a copolyester composition was obtained. Then, a melting peak temperature of the copolyester composition was measured. The result is set forth in Table 1.

In a $^{13}$C-NMR spectrum of the copolyester composition as measured in a mixed solvent of deuterated chloroform and deuterated trifluoroacetic acid, a signal of 61.27 ppm was taken as a signal of GA-GA-GA, and a signal of 61.72 ppm was taken as a signal of EG(and DEG)-GA-IA and EG(and DEG)-GA-TA, and from their intensity ratio, a $S_{AA}/S_{BB}$ value was determined.

The copolyester composition was dried at about 70° C. for about 20 hours under reduced pressure, and a given amount of the composition was interposed between two brass plates, aluminum plates and release films, then melted at 280° C., compressed at 10 MPa for 1 minute and then compressed again at 10 MPa with cooling by a compression molding machine set at 0° C. to obtain a pressed film having a thickness of about 70 μm. Then, gas barrier properties of the film were measured. Further, a pressed film having a thickness of 200 μm was prepared, and haze and hue (b value) of the film were measured. The results are set forth in Table 1.

Example 2

In a similar manner to that of Example 1, 90 parts by weight of polyethylene terephthalate and 10 parts by weight of the copolyester (A2) prepared in Preparation Example 2 were mixed to obtain a resin composition. Then, molding and evaluation were carried out in the same manner as in Example 1. The results are set forth in Table 1.

Example 3

90 Parts by weight of commercially available polyethylene terephthalate having been sufficiently dried by a vacuum dryer and 10 parts by weight of the copolyester (A1) prepared in Preparation Example 1 were melt mixed by a labo-plastomill (manufactured by Toyo Seiki) for 18 minutes under the conditions of 280° C. and 100 rpm to obtain a copolyester composition. Then, molding and evaluation were carried out in the same manner as in Example 1. The results are set forth in Table 1.

Example 4

In a similar manner to that of Example 3, 95 parts by weight of polyethylene terephthalate and 5 parts by weight of the polyglycolic acid (Tg: 43° C., Tm: 223° C., number-average molecular weight in terms of PMMA: 100000 (hexafluoro-2-propanol solvent)) prepared in Preparation Example 4 were mixed to obtain a copolyester composition. Then, molding and evaluation were carried out in the same manner as in Example 1. The results are set forth in Table 1.

Example 5

93 Parts by weight of commercially available polyethylene terephthalate having been sufficiently dried by a vacuum dryer and 7 parts by weight of the copolyester (A3) prepared in Preparation Example 3 were melt mixed by a labo-plastomill for 10 minutes under the conditions of 280° C. and 100 rpm to obtain a copolyester composition. Then, molding and evaluation were carried out in the same manner as in Example 1. The results are set forth in Table 1.

Example 6

90 Parts by weight of commercially available polyethylene terephthalate having been sufficiently dried by a vacuum dryer and 10 parts by weight of the copolyester (A3) prepared in Preparation Example 3 were melt mixed by a labo-plastomill for 18 minutes under the conditions of 280° C. and 100 rpm to obtain a copolyester composition. Then, molding and evaluation were carried out in the same manner as in Example 1. The results are set forth in Table 1.

Example 7

70 Parts by weight of commercially available polyethylene terephthalate having been sufficiently dried by a vacuum dryer and 30 parts by weight of the copolyester (A3) prepared in Preparation Example 3 were melt mixed by a twin-screw extruder of 30 mm diameter equipped with a constant rate feeder (manufactured by Plastic Kogyo Kenkyusho) under the conditions of a cylinder temperature 280° C., a screw rotation number of 300 rpm and an extrusion rate of 30 g/min to obtain a copolyester composition. Then, molding and evaluation were carried out in the same manner as in Example 1. The results are set forth in Table 1.

Example 8

The copolyester composition obtained in Example 7 was sufficiently dried by a vacuum drier, maintained in an oven at 150° C. for 2 hours in a stream of nitrogen to perform pre-crystallization and then maintained at 200° C. for 48 hours in a stream of nitrogen to perform solid phase polymerization reaction. Thus, a copolyester composition was obtained. A loss in weight due to the solid phase polymerization was 6% by weight. As a result of NMR spectroscopy, the glycolic acid content was 24.6% by weight (34.1% by mol). Then, the copolyester composition was subjected to molding and evaluation in the same manner as in Example 1. The results are set forth in Table 1.

Comparative Example 1

In a similar manner to that of Example 3, 90 parts by weight of polyethylene terephthalate and 10 parts by weight of the polyglycolic acid prepared in Preparation Example 4 were mixed to obtain a copolyester composition. Then, molding and evaluation were carried out in the same manner as in Example 1. The results are set forth in Table 1. The composition had a higher $S_{AA}/S_{BB}$ value and a higher haze value as compared with Example 4.

Comparative Example 2

In a reactor equipped with a stirring device and a distilling tube, 16.7 g of ethyl glycolate, 93.2 g of dimethyl terephthalate, 59.6 g of ethylene glycol and 0.08 g of manganese acetate tetrahydride were placed.

The reactor was thoroughly purged with nitrogen, then the system was heated up to 220° C. from 160° C. over a period of 6 hours in a nitrogen atmosphere at atmospheric pressure with stirring, and 1.58 g of an ethylene glycol solution containing 0.12 g of an ester was added with distilling off methanol. The system was thoroughly purged with nitrogen and then stirred at 220° C. for 20 minutes in a stream of nitrogen at atmospheric pressure. Subsequently, the system was heated up to 260° C. over a period of 80 minutes and maintained at 260° C. for 30 minutes. Thereafter, the vacuum pump was actuated to reduce the pressure to 1 Torr over a period of 1 hour, and the system was heated up to 280° C. and continuously stirred for 4 hours under reduced pressure of 1 Torr to perform polycondensation. After the polycondensation reaction, a nitrogen gas was introduced into the system to return the pressure of the system to atmospheric pressure, and a copolyester produced was taken out of the reactor. The resulting copolyester had a brown color. Then, the polyester was subjected to molding and evaluation in the same manner as in Example 1. The results are set forth in Table 1.

As a result of NMR spectroscopy, the copolyester contained 4.6% by weight (7.5% by mol) of glycolic acid units, and this copolyester had composition near to that of Example 4. This polyester, however, had an $S_{AA}/S_{BB}$ value of 0 and low degree of block polymerization, and had a lower melting peak temperature and lower heat resistance as compared with Example 4. Moreover, because the copolyester was prepared by direct polymerization and had long-time heat history, it had bad hue.

Comparative Example 3

90 Parts by weight of commercially available polyethylene terephthalate having been sufficiently dried by a vacuum dryer and 10 parts by weight of the copolyester (A4) prepared in Preparation Example 5 were melt mixed by a labo-plastomill (manufactured by Toyo Seiki) for 10 minutes under the conditions of 280° C. and 100 rpm to obtain a copolyester composition. Then, molding and evaluation were carried out in the same manner as in Example 1. The results are set forth in Table 1. The glycolic acid content in the copolyester (4) was low, and the $S_{AA}/S_{BB}$ value was low. Therefore, the gas barrier properties of the copolyester composition were low in spite that the same amount of the hydroxy carboxylic acid copolyester as that in Example 1, Example 2, Example 3 and Example 6 was added to polyethylene terephthalate.

Comparative Example 4

Commercially available polyethylene terephthalate was subjected to molding and evaluation in the same manner as in Example 1. The results are set forth in Table 1.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Glycolic acid unit content (wt. %) |  | 5.8 | 4.5 | 5.8 | 5.0 | 6.8 | 9.7 | 29.0 |
| Glycolic acid unit content (mol. %) |  | 9.3 | 7.3 | 9.3 | 8.1 | 10.8 | 15.1 | 40.5 |
| A component | A/(A + B) (wt. %) | A1 | A2 | A1 | PGA | A3 | A3 | A3 |
| Weight fraction |  | 10 | 10 | 10 | 5 | 7 | 10 | 30 |
| B component | B/(A + B) (wt. %) | PET | PET | PET | PET | PET | PET | PET |

TABLE 1-continued

| | | | | | | | | |
|---|---|---|---|---|---|---|---|---|
| Weight fraction | | 90 | 90 | 90 | 95 | 93 | 90 | 70 |
| Treating conditions | | extruder | extruder | plastomill | plastomill | plastomill | plastomill | extruder |
| Reduced viscosity IV (dl/g) | | 0.698 | 0.778 | 0.643 | 0.623 | 0.693 | 0.601 | 0.467 |
| $^{13}$C-NMR signal intensity ratio (%) | GA-GA-GA (S1: $S_{AA}$) | 29 | 27 | 29 | 46 | 64 | 54 | 72 |
| | EG-GA-GA (S2) | 25 | 22 | 20 | 22 | 14 | 17 | 11 |
| | GA-GA-PA (S3) | 24 | 27 | 27 | 23 | 17 | 21 | 13 |
| | EG-GA-PA (S4: $S_{BB}$) | 22 | 24 | 23 | 8 | 5 | 8 | 4 |
| $S_{AA}/S_{BB}$ (a.u.) | | 1.3 | 1.1 | 1.2 | 5.8 | 13 | 6.8 | 18 |
| Melting peak temperatur Tm (° C.) | | 243.2 | 243.5 | 234.8 | 240.6 | 241.8 | 236.7 | 211 |
| CO2 permeability consta (cc · mm/m2 · day · atm) | | 15.1 | 15.3 | 15.5 | 18.9 | 15.3 | 13.4 | 5.5 |
| (Pb + Pa · F)/(1 + F) | | 22.6 | 22.7 | 22.6 | 24.4 | 23.6 | 22.7 | 16.5 |
| Transparency | Haze[%] | 0.9 | 0.4 | 1.7 | 2.7 | 5.8 | 4.1 | 12.5 |
| Hue | b value | −1.05 | −3.68 | −1.23 | −3.17 | −3.7 | −3.45 | 1.85 |

| | | Ex. 8 | Comp. Ex. 1 | Comp. Ex. 2 | Comp. Ex. 3 | Comp. Ex. 4 |
|---|---|---|---|---|---|---|
| Glycolic acid unit content (wt. %) | | 23.7 | 10.0 | 4.6 | 1.3 | 0 |
| Glycolic acid unit content (mol. %) | | 34.1 | 15.6 | 7.5 | 2.1 | 0 |
| A component | A/(A + B) (wt. %) | A3 | PGA | — | A4 | — |
| Weight fraction | | (30) | 10 | — | 10 | — |
| B component | B/(A + B) (wt. %) | PET | PET | — | PET | PET |
| Weight fraction | | (70) | 90 | — | 90 | 100 |
| Treating conditions | | extruder + solid phase polymerization | plastomill | polymerization | plastomill | — |
| Reduced viscosity IV (dl/g) | | 0.923 | 0.573 | 0.522 | 0.745 | 0.82 |
| $^{13}$C-NMR signal intensity ratio (%) | GA-GA-GA (S1: $S_{AA}$) | 60 | 72 | 0 | 1 | — |
| | EG-GA-GA (S2) | 16 | 10 | 3 | 9 | — |
| | GA-GA-PA (S3) | 17 | 16 | 2 | 11 | — |
| | EG-GA-PA (S4: $S_{BB}$) | 7 | 2 | 95 | 79 | — |
| $S_{AA}/S_{BB}$ (a.u.) | | 8.6 | 36 | 0 | 0.01 | — |
| Melting peak temperatur Tm (° C.) | | 220 | 240.6 | 228.9 | 241.2 | 252 |
| CO2 permeability consta (cc · mm/m2 · day · atm) | | 6.2 | 13.2 | 18.5 | 20.6 | 26 |
| (Pb + Pa · F)/(1 + F) | | 16.5 | 22.8 | — | 23 | — |
| Transparency | Haze[%] | 3.5 | 58.9 | 1 | 1.1 | 0.5 |
| Hue | b value | 4.23 | −0.16 | 17.43 | −1.64 | −4.85 |

Notes:
S1(SAA): GA-GA-GA
S2: EG(and DEG)-GA-GA
S3: GA-GA-PA
S4(SBB): EG(and DEG)-GA-PA
PA is a phthalic acid type unit (IA + TA).

What is claimed is:

1. A polyester resin composition which is obtained by melt mixing (A) a copolyester, in an amount of 1 to 50 parts by weight, with (B) a crystalline polyester that is not identical with component (A), in an amount of 99 to 50 parts by weight,
wherein the copolyester (A) comprises a hydroxy carboxylic acid unit as constituent units, in which hydroxy carboxylic acid units of 5 or less carbon atoms are contained in amounts of 60 to 98% by mol based on 100% by mol of all the constituent units in (A) and the residue units are composed of a dicarboxylic acid unit and a diol unit,
wherein hydroxy carboxylic acid units of 5 or less carbon atoms are contained in amounts of 2 to 75% by mol based on 100% by mol of all the constituent units contained in the composition,
wherein the copolyester (A) has a glass transition temperature of 25 to 90° C., and
wherein a molar ratio $S_{AA}$ of hydroxy carboxylic acid units, both of whose neighboring units are hydroxy carboxylic acid units, to all the hydroxy carboxylic acid units contained and a molar ratio $S_{BB}$ of hydroxy carboxylic acid units, neither of whose neighboring units is a hydroxy carboxylic acid unit, to all the hydroxy carboxylic acid units contained satisfy the following formula:

$0.03 < S_{AA}/S_{BB} < 30$.

2. The polyester resin composition as claimed in claim 1, wherein hydroxy carboxylic acid units of 5 or less carbon atoms are contained in amounts of 60 to 98% by mol, and hydroxy carboxylic acid units of 5 or less carbon atoms, aromatic dicarboxylic acid units and diol units of 4 or less carbon atoms are contained in the total amounts of not less than 95% by mol, based on 100% by mol of all the constituent units of the hydroxy carboxylic acid copolyester (A).

3. The polyester resin composition as claimed in claim 2, wherein, of the constituent units of the hydroxy carboxylic acid copolyester (A), the hydroxy carboxylic acid units are units of glycolic acid, the diol units are units of ethylene glycol, and the aromatic dicarboxylic acid units are units of at least one dicarboxylic acid selected from isophthalic acid, terephthalic acid and naphthalenedicarboxylic acid.

4. The polyester resin composition as claimed in claim 1, wherein hydroxy carboxylic acid units of 5 or less carbon atoms are contained in amounts of 2 to 15.1% by mol based on 100% by mol of all the constituent units contained in the composition.

* * * * *